United States Patent [19]

Lermann et al.

[11] 4,195,921
[45] Apr. 1, 1980

[54] PHOTOGRAPHIC APPARATUS WITH MEANS FOR DIFFERENTLY INDICATING THE INTENSITY OF SCENE LIGHT FOR DIFFERENTLY SENSITIVE FILMS

[75] Inventors: Peter Lermann, Narring; Karl Wagner, Münich; Dieter Engelsmann, Unterhaching, all of Fed. Rep. of Germany

[73] Assignee: AGFA-Gevaert, A.G., Leverkusen, Fed. Rep. of Germany

[21] Appl. No.: 891,270

[22] Filed: Mar. 29, 1978

[30] Foreign Application Priority Data

Mar. 30, 1977 [DE] Fed. Rep. of Germany ....... 2714149

[51] Int. Cl.² .......................... G03B 7/08; G03B 17/18
[52] U.S. Cl. ......................................... 354/21; 354/49; 354/59; 354/51; 354/60 L
[58] Field of Search .................. 354/21, 53, 28, 42, 354/37, 41, 49, 51, 58, 59, 60 E, 60 L, 273, 289; 352/78 C, 92; 356/226

[56] References Cited

U.S. PATENT DOCUMENTS

| | | | |
|---|---|---|---|
| 3,460,450 | 8/1969 | Ogihara | 354/51 |
| 3,638,542 | 2/1972 | Wagner | 354/41 X |
| 3,958,256 | 5/1976 | Wagensonner et al. | 354/60 L X |
| 4,087,830 | 5/1978 | Wagensonner | 354/60 L |

*Primary Examiner*—L. T. Hix
*Assistant Examiner*—William B. Perkey
*Attorney, Agent, or Firm*—Peter K. Kontler

[57] ABSTRACT

A photographic apparatus which can accept cassettes for high-speed or lower-sensitivity film has a mechanical or electronic switch which automatically deactivates a light-emitting diode which serves to indicate the intensity of scene light as soon as a cassette for high-speed film is properly inserted into the body of the apparatus. Such cassette further causes a filter to move out of register with the light-sensitive resistor which is in circuit with the diode and is exposed to scene light. The diode is also deactivated if the diaphragm is adjusted to furnish an aperture of maximum or minimum size; alternatively, the diode is deactivated only when the body of the apparatus contains high-speed film and the diaphragm is adjusted to furnish an aperture of maximum or minimum size.

10 Claims, 2 Drawing Figures

PHOTOGRAPHIC APPARATUS WITH MEANS FOR DIFFERENTLY INDICATING THE INTENSITY OF SCENE LIGHT FOR DIFFERENTLY SENSITIVE FILMS

BACKGROUND OF THE INVENTION

The present invention relates to photographic apparatus in general, and more particularly to improvements in photographic apparatus of the type having means for indicating the intensity of scene light. Still more particularly, the invention relates to improvements in photographic apparatus of the type wherein the indicating means is in circuit with light-sensitive resistor means or the like to enable the user of the apparatus to ascertain whether or not the intensity of scene light is satisfactory for the making of acceptable exposures.

OBJECTS AND SUMMARY OF THE INVENTION

An object of the present invention is to provide a photographic apparatus, e.g., a still camera, with novel and improved means for simplifying the manipulation of the apparatus and for enabling the user to make acceptable exposures regardless of the sensitivity of film which is confined in the housing of the apparatus.

Another object of the invention is to provide novel and improved means for regulating the intensity of scene light which reaches the exposure controls in dependency on the sensitivity of film which is confined in the housing of the photographic apparatus.

A further object of the invention is to provide a photographic apparatus of the type having means for indicating the intensity of scene light with novel and improved means for influencing the operation of such indicating means in dependency on the sensitivity of film which is confined in the housing of the apparatus.

An additional object of the invention is to provide a photographic apparatus of the just outlined character wherein the number of operations or steps which must be carried out prior to the making of an exposure is reduced in automatic response to insertion of a container for photographic film whose sensitivity exceeds a predetermined level.

Another object of the invention is to provide a photographic apparatus wherein the means for indicating the intensity of scene light is automatically adjusted or deactivated as a function of the sensitivity (speed) of photographic film which is confined in the housing of the photographic apparatus.

An ancillary object of the invention is to provide novel and improved containers for photographic film which can be used in photographic apparatus fo the above outlined character.

An additional object of the invention is to provide the photographic apparatus with novel and improved means for influencing the means which indicates the intensity of scene light in dependency on the selected f/stop.

A further object of the invention is to provide a photographic apparatus with simple, compact and inexpensive but reliable means for influencing the scene-brightness-indicating means as a function of the sensitivity of photographic film which is confined in the housing or body of the apparatus.

Another object of the invention is to provide the photographic apparatus with novel and improved means for automatically influencing the extent to which scene light can impinge upon the light-sensitive element of the exposure controls as a function of the sensitivity of inserted photographic film.

One feature of the invention resides in the provision of a photographic apparatus which has a housing or body with a chamber for reception of first and second types of containers respectively confining high-sensitivity and lower-sensitivity photographic films. In accordance with the invention, the photographic apparatus comprises exposure control means including light-sensitive resistor means which is disposed in the path of scene light and which normally influences the shutter speed by way of suitable electronic circuitry preferably including a threshold circuit and electromagnet means for actuating the shutter, indicating means (e.g., one or more light-emitting diodes) which is normally operative to indicate the intensity of scene light as a function of the condition of the light-sensitive resistor means (i.e., to indicate whether or not the intensity of scene light is too high or too low for the making of satisfactory exposures with a certain type of film), and disengaging means (e.g., a normally closed mechanical switch or a normally closed electronic switch) for rendering the indicating means inoperative in response to insertion of a container of the first type into the housing of the photographic apparatus.

The apparatus preferably further comprises a grey filter or other suitable means for influencing the sensitivity of the light-sensitive resistor means to scene light. The influencing means is movable between first and second positions (e.g., in front of and out of register with the resistor means) in which the sensitivity of the resistor means is respectively influenced to a first and to a second extent. Such apparatus further comprises means (e.g., a mechanical linkage or other suitable motion transmitting means) for moving the influencing means from one to the other of its two positions in response to insertion of a container of the first type into the housing of the photographic apparatus.

If the aforementioned switch is a mechanical switch, such switch can be automatically opened by a trip or the like provided on each container of the first type.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
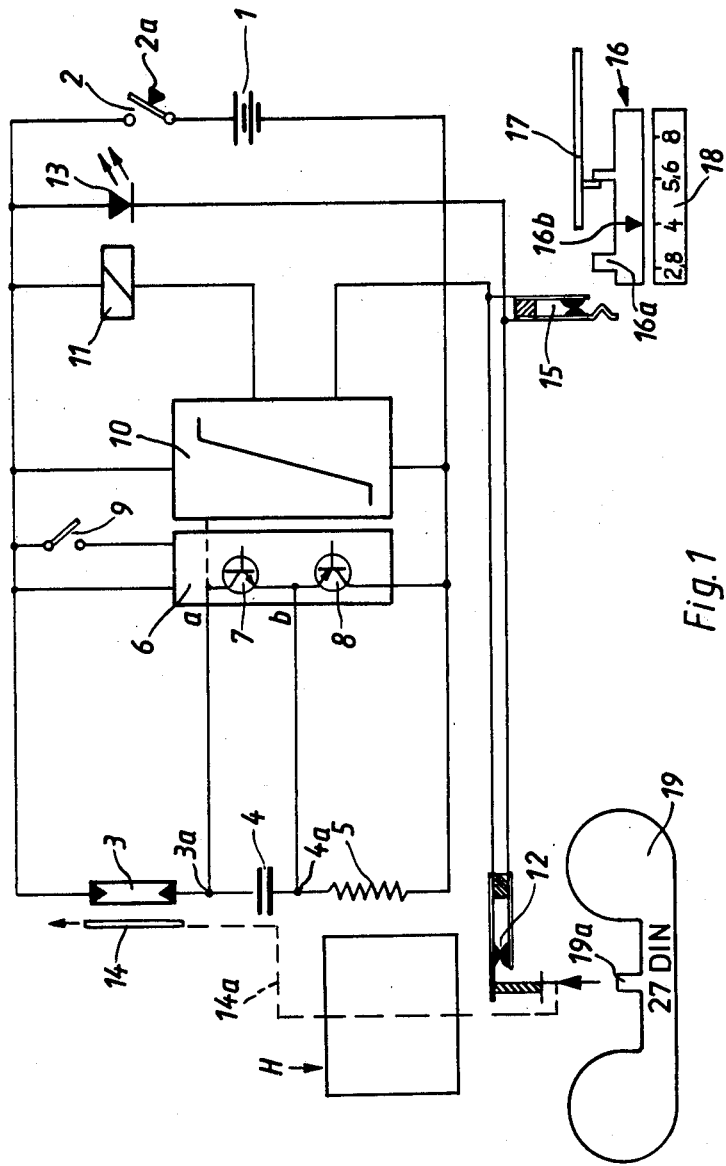
FIG. 1 is a diagrammatic view of a portion of a photographic apparatus which embodies one form of the invention.

Referring to FIG. 1, there is shown a portion of a photographic apparatus which includes a battery 1 or another suitable source of electrical energy which is in series with a camera release switch 2. When the switch 2 is closed, it completes a circuit which further includes a light-sensitive resistor 3 in series with a capacitor 4 and an indicating resistor 5. The resistor 3 is installed in the housing H of the photographic apparatus so that it is located in the path of incoming scene light. The taps 3a and 4a between the elements 3, 4 and 4, 5 are connected to the corresponding inputs a and b of an electronic switching stage 6 which includes, among others, two complementary transistors 7 and 8. Reference may be had, for example, to U.S. Pat. No. 3,460,450 granted Aug. 12, 1969. The switching stage 6 is activated in response to closing of a switch 9 which is open prior to but is closed during the making of an exposure to insure appropriate adjustment of exposure controls. For example, the switch 9 can be closed in automatic response to actuation of a trip 2a for the camera release switch 2. The transistor 7 is energized when the switch 9 is open (the transistor 8 is then in a quiescent state). The situation is reversed when the switch 9 is closed. The output of the switching stage 6 is connected to a threshold circuit 10 whose output is connected with an electromagnet 11 serving as a means for actuating the shutter.

The output of the threshold circuit 10 is further connected to a normally closed mechanical disengaging switch 12 which is in series with an indicating device 13, e.g., a light-emitting diode, serving to indicate whether or not the intensity of scene light is sufficient for the making of an exposure. The diode 13 is assumed to indicate the lower limit of the range of acceptable intensities of scene light. The switch 12 opens automatically in response to proper insertion of a container 19 (e.g., a customary drop-in cassette) for highly sensitive photographic film, e.g., a film whose speed equals 27 DIN (in German norms). To this end, the cassette 19 comprises an index or marker 19a (e.g., a projection or trip) which automatically opens the switch 12 as soon as the cassette is properly inserted into its chamber in the housing H of the photographic apparatus. At the same time, the index 19a actuates a mechanical motion transmitting connection 14a (indicated by broken lines) which moves a gray filter wedge 14 out of register with the light-sensitive resistor 3. The filter 14 is normally located in the path of incoming scene light which impinges upon the photosensitive surface of the resistor 3. Thus, the filter 14 influences the sensitivity of the resistor 3 to a first extent when it is located in the illustrated position (i.e., when the housing H receives a cassette which is loaded with film of relatively low sensitivity because such cassette does not have a trip 19a), and the filter 14 influences the sensitivity of the resistor 3 to a second extent (i.e, it does not influence the resistor 3 at all) when the housing H receives a cassette 19 whose trip 19a can actuate the connection 14a to move the filter 14 in the direction indicated by arrow.

The mechanical switch 12 is connected in parallel with a second normally closed mechanical switch 15 which is located in the path of movement of a diaphragm adjusting device 16. The latter serves to displace a component 17 of an adjustable diaphragm and has a marker 16a adjacent to a scale 18 which is calibrated to indicate the selected aperture size. When the diaphragm including the component 17 is adjusted to furnish an aperture of maximum or minimum size (in the illustrated embodiment, the size is the maximum size, namely, 2.8), the left-hand end portion 16a of the adjusting device 16 opens the switch 15.

The sensitivity of a 27 DIN photographic film is merely an example of high film sensitivities. Thus, a film whose sensitivity is 27 DIN is extremely fast when compared with an 18 DIN film. Film speeds in the range of 18 DIN are considered to be normal or average. By using a 27 DIN film, one can broaden the range of acceptable light intensities by three steps in a direction toward lower intensity. Moreover, when using negative films, and starting from correct illumination, one can make satisfactory exposures even if the intensity of light deviates at least by ±two steps from an optimum intensity. Consequently, one can make satisfactory exposures of poorly illuminated subjects or scenes without resorting to sources of artificial illumination by the simple expedient of using a high-speed film. The user of the apparatus will instinctively resort to a flash unit when the intensity of light is unsatisfactory for the making of acceptable exposures with a high-speed film because the illumination is then so poor that the user cannot readily discern the outline of a person or object.

The situation is different when the camera is loaded with film of average sensitivity. The user is then compelled to ascertain the intensity of scene light because the range of acceptable light intensities is only a small fraction of that range which is available when the photographic apparatus contains high-speed film. Such determination is not needed when the apparatus contains film which can be classified as high-speed or high-sensitivity film. Therefore, the trip 19a automatically opens the circuit of the diode 13 (i.e., it renders the indicating means inoperative) when the cassette 19 is properly inserted into the housing H of the photographic apparatus. As mentioned above, the diode 13 can indicate the maximum or minimum acceptable intensity of scene light when the apparatus is loaded with film of average sensitivity. Once the apparatus is loaded with high-speed film, the user is not compelled to rely on the diode 13, especially for determination of lowest acceptable intensity of scene light, because the film is sufficiently sensitive to allow for the making of satisfactory exposures as long as the user is capable of discerning the subject which is to be photographed.

The switch 15 is in parallel with the switch 12. Consequently, the circuit of the diode 13 opens only when the switch 12 is open and the switch 15 is also open. This insures that the diode 12 is not in a condition to indicate whether or not the intensity of scene light is acceptable only under those circumstances when the apparatus contains a roll of high-speed film (in the cassette 19) and the adjustment of the diaphragm in a direction to admit more light during the making of an exposure is already at an end, i.e., when the adjusting device 16 is incapable of insuring the admission of more scene light.

It should be noted that the switch 15 is a desirable but optional feature of the photographic apparatus. When the switch 15 is omitted, the diode 13 is rendered inoperative in immediate response to opening of the switch 12, i.e., in response to proper insertion of a cassette 19 which contains high-speed film. The exposure time is then determined by the amount of scene light which impinges directly upon the resistor 3 because the filter 14 is withdrawn from the path of incoming light as soon as the cassette 19 opens the switch 12.

The photosensitive resistor 3 influences the exposure time when the intensity of scene light is relatively high. The influence of this resistor decreases gradually, and the influence of the resistor 5 increases proportionally, when the intensity of scene light decreases.

Figure 2:
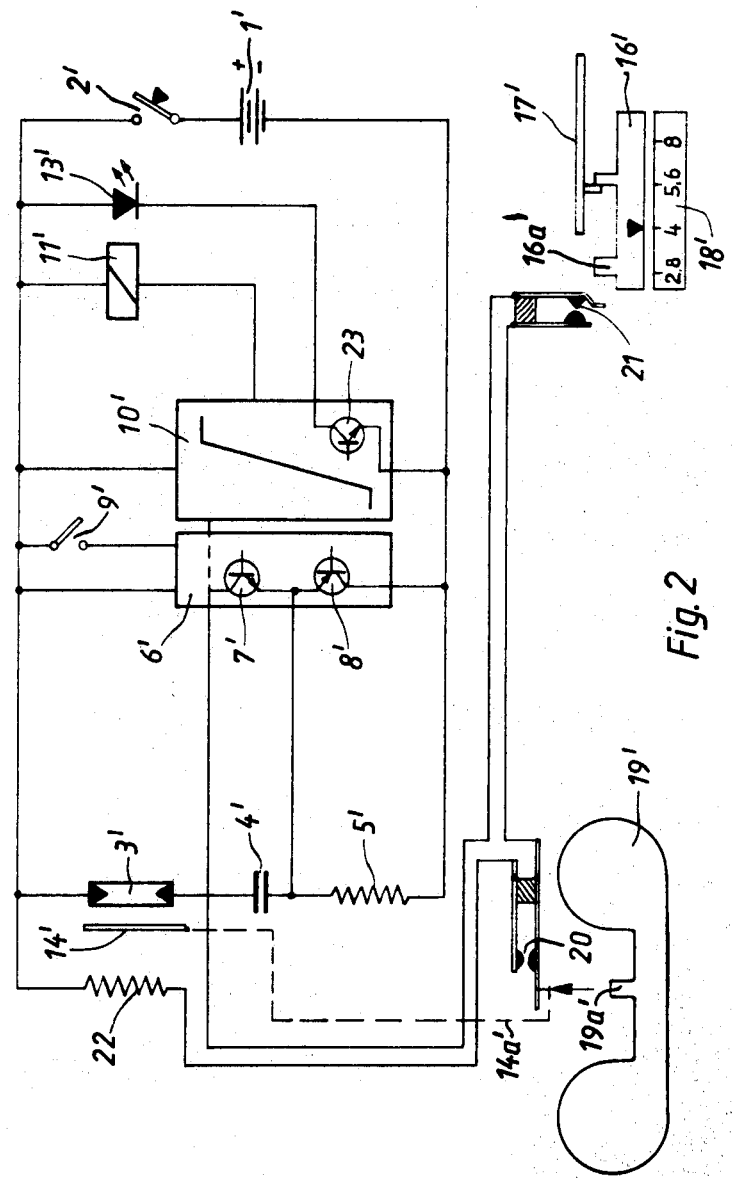
FIG. 2 is a similar diagrammatic view of a portion of a modified photographic apparatus.

FIG. 2 illustrates a portion of a second photographic apparatus wherein all such parts which are identical with or clearly analogous to corresponding parts of the apparatus of FIG. 1 are denoted by similar reference characters each followed by a prime. The index or trip 19a' of the properly inserted cassette 19' for highly sensitive photographic roll film closes a mechanical switch 20 which is connected in series with a second mechanical switch 21. The latter is closed by the diaphragm adjusting device 16' when the diaphragm including the component 17' defines an aperture of maximum or minimum size (in the embodiment of FIG. 2, the selected size is the maximum size). When the switches 20 and 21 are closed, an exposure time selecting resistor 22 which insures that the shutter furnishes a predetermined exposure time (e.g., 1/30 second) is connected in parallel with the light-sensitive resistor 3'. When the resistor 22 is connected in the circuit, an electronic disengaging switch 23 in the threshold circuit 10' automatically blocks and thus opens the circuit of the light-emitting diode 13'.

The structure of FIG. 2 differs from the structure of FIG. 1 in that the resistor 22 automatically takes over the determination of exposure time when the cassette 19' for high-speed film is properly inserted into its chamber and the diaphragm is adjusted to furnish an aperture of an extreme size. Thus, the resistor 22 selects the exposure time (e.g., 1/30 second) when the diaphragm is set for an f/stop of 2.8 and the apparatus contains a roll of high-speed film. The exposure time which is set by the resistor 22 is preferably selected in such a way that the user can make satisfactory exposures which are not influenced by camera shake while the apparatus is held by hand, i.e., while the user need not resort to a tripod.

The electronic switch 23 is a functional equivalent of the mechanical switch 12 in the apparatus of FIG. 1. The switches 20 and 21 insure that the exposure time is not selected in dependency on the intensity of scene light when the cassette 19' is properly inserted and the adjustment of the aperture size in one direction is completed. The exposure time is determined by the resistor 3' as long as the switch 21 remains open. Also, the electronic switch 23 is deactivated only when the mechanical switches 20 and 21 are closed at the same time.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. In a photographic apparatus having a housing for reception of containers of first and second types which respectively confine high-sensitivity and lower-sensitivity photographic films and the first type of which has an external formation absent from the second type, the combination of exposure control means including light-sensitive resistor means disposed in the path of scene light; indicating means normally operative to indicate the intensity of scene light as a function of the condition of said resistor means; and disengaging means for rendering said indicating means inoperative in response to insertion into said housing of a container of said first type and upon ascertaining the presence of the external formation of the latter.

2. The combination of claim 1, wherein said disengaging means includes a normally closed switch and said external formation is operative for effecting the opening of said switch in response to insertion of the container of the first type into said housing.

3. The combination of claim 2, further comprising means for influencing the sensitivity of said light-sensitive resistor means to scene light, said influencing means being movable between first and second positions in which the sensitivity of said resistor means is respectively influenced to a first and to a second extent, and means for moving said influencing means from one of said positions to the other of said positions in response to insertion into said housing of a container of said first type and upon ascertaining the presence of the external formation of the latter.

4. The combination of claim 2, wherein said switch is a mechanical switch and the external formation is a projection operative for mechanically acting on and opening said switch in response to insertion of the container of the first type into said housing.

5. The combination of claim 2, further comprising a normally closed second switch connected in parallel with said first mentioned switch, adjustable diaphragm means and means for adjusting said diaphragm means so that the latter furnishes apertures of different sizes including a first aperture of maximum size and a second aperture of minimum size, said adjusting means including means for opening said second switch when said diaphragm means furnishes an aperture having one of said first and second sizes.

6. The combination of claim 2, wherein said switch is an electronic switch, and further comprising exposure time selecting means and means for actuating said selecting means in response to insertion into said housing of a container of said first type and upon ascertaining the presence of the external formation of the latter.

7. The combination of claim 6, wherein said actuating means includes a second switch which is operated to actuate said selecting means in response to insertion into said housing of a container of said first type and upon ascertaining the presence of the external formation of the latter.

8. The combination of claim 6, wherein said actuating means comprises a normally open second switch and said external formation is operative for closing said second switch in response to insertion of a container of said first type into said housing, and further comprising a normally open third switch in series with said second switch, adjustable diaphragm means and means for adjusting said diaphragm means so that the latter furnishes apertures of different sizes including a first aperture of maximum size and a second aperture of minimum size, said adjusting means including means for closing said third switch when said diaphragm means furnishes an aperture having one of said first and second sizes.

9. The combination of claim 1, wherein said indicating means includes a light-emitting element.

10. The combination of claim 1, wherein said exposure control means further comprises capacitor means in series with said resistor means, second resistor means in series with said capacitor means, an electronic switching stage having a first input connected with a tap between said light-sensitive resistor means and said capacitor means, a second input connected with a tap between said capacitor means and said second resistor means, and an output, a threshold circuit having an input connected with said output, a first output connected with said indicating means by way of said disengaging means and a second output, and shutter actuating means connected with said second output.

* * * * *